Nov. 13, 1956  D. T. AYERS, JR., ET AL  2,770,223
FLUID PRESSURE OPERATED MOTOR
Original Filed April 2, 1954  3 Sheets-Sheet 1

INVENTORS
DAVID T. AYERS JR.
EDWARD GOVAN HILL
BY John F. Phillips
ATTORNEY

Nov. 13, 1956  D. T. AYERS, JR., ET AL  2,770,223
FLUID PRESSURE OPERATED MOTOR
Original Filed April 2, 1954  3 Sheets-Sheet 2
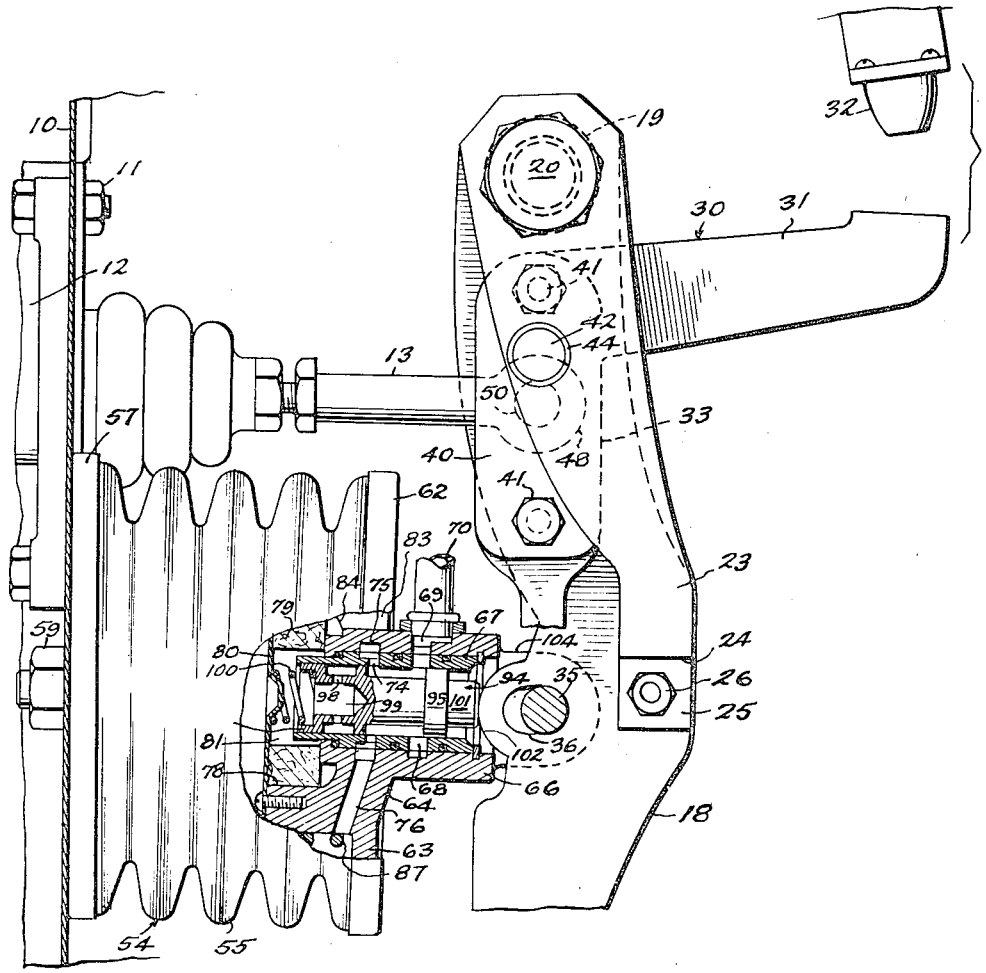
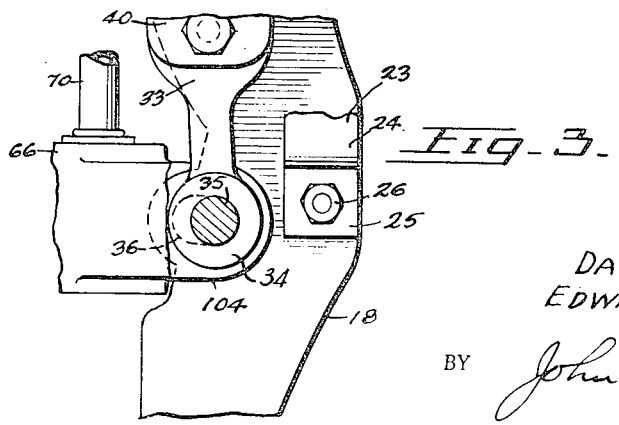
INVENTORS
DAVID T. AYERS JR.
EDWARD GOVAN HILL
BY John F. Phillips
ATTORNEY Nov. 13, 1956  D. T. AYERS, JR., ET AL  2,770,223
FLUID PRESSURE OPERATED MOTOR
Original Filed April 2, 1954  3 Sheets-Sheet 3
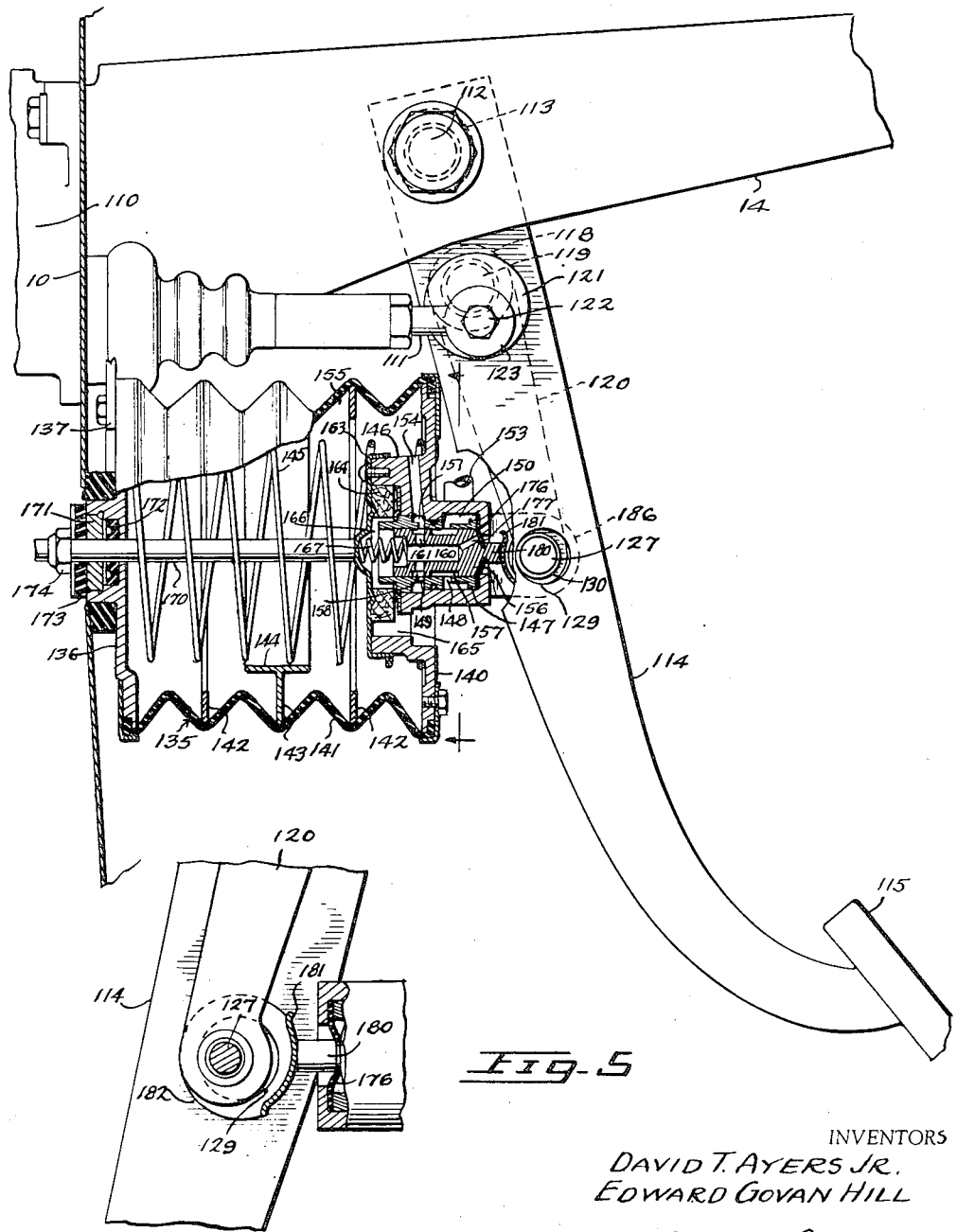
INVENTORS
DAVID T. AYERS JR.
EDWARD GOVAN HILL
BY *John F. Phillips*
ATTORNEY

United States Patent Office 2,770,223
Patented Nov. 13, 1956

2,770,223

FLUID PRESSURE OPERATED MOTOR

David T. Ayers, Jr., and Edward Govan Hill, Birmingham, Mich., assignors to Kelsey-Hayes Wheel Company, Detroit, Mich., a corporation of Delaware Original application April 2, 1954, Serial No. 420,488. Divided and this application March 14, 1955, Serial No. 494,204

13 Claims. (Cl. 121—41)

This invention relates to a fluid pressure motor and is a division of our co-pending application Serial No. 420,488 filed April 2, 1954, for Booster Brake Mechanism.

In our co-pending application referred to there is disclosed a booster brake mechanism including a fluid pressure motor and the apparatus is operable through the medium of a depending brake pedal mechanism supported at its upper end by a bracket extending rearwardly from the fire wall of the motor vehicle. The apparatus is characterized by simplicity in construction and installation. The master cylinder from which fluid is displaced through the brake line is supported by the fire wall forwardly thereof and has its plunger operative through the medium of a rod extending rearwardly through the fire wall and connected to the pedal mechanism. The booster motor is arranged beneath the operating rod from the master cylinder and is connected to the pedal mechanism to be initially energized upon movement of the pedal pad from its normal off position. There are certain cooperative features of relationship between the booster motor and the pedal mechanism. There are other features of construction which are pertinent to the motor per se, thus rendering such motor applicable for generating and applying force other than in its association with a vehicle brake mechanism. These features of the motor per se form the subject matter of the present application.

An important object of the present mechanism is to provide a novel type of fluid pressure motor wherein stationary and movable motor heads are connected to each other by a bellows which cooperates with the heads to form an interior motor chamber, and to provide novel means for controlling communication of said motor chamber with the atmosphere and with a source of vacuum, to thus control the energization of the motor.

A further object is to provide such a motor wherein the movable head carries therewithin a novel follow-up control valve mechanism operable from a point externally of the motor to control the energization thereof, and to provide in association with such movable head a self-contained air cleaner and a connection adapted to lead to a source of vacuum, the entire controlling means for the motor thus being carried wholly by the movable head of the motor.

A further object is to provide a motor construction of the character referred to wherein the movable head is provided with a vacuum chamber connected to a source of vacuum and wherein movable means is provided for sealing the valve parts in the off positions thereof to prevent any seepage of air from the motor chamber into the vacuum chamber when the motor is intended to be inoperative, the sealing means also serving to prevent the seepage of any air from the atmosphere into the vacuum chamber.

A further object is to provide such a motor wherein novel means is employed for maintaining the flexible bellows properly subtended when vacuum is present in the motor chamber thus rendering differential pressure effective for moving the motor head while preventing the radial collapsing of the bellows.

A further object is to provide the motor with a return spring normally urging the movable head to its off position and to utilize such spring for assisting in maintaining the normal shape of the motor bellows against the sagging thereof intermediate its ends.

A further object is to provide such a motor with a supporting rod fixed at one end to the movable motor head and operable through the stationary head in sealed relationship thereto to assist in maintaining the movable head in its proper position against tilting incident to any sagging of the bellows.

A further object is to provide a rod of the character just referred to which has associated therewith means for limiting the movable head to its off position and to silence the stopping of the movable head when it returns to its normal position after the motor has been energized.

Other objects and advantages of the invention will become apparent during the course of the following description.

In the drawings we have shown two embodiments of the invention. In this showing:

Figure 2 is a view similar to Figure 1, showing the valve parts in operative positions;

Figure 3 is a detail sectional view showing the lever elements and associated parts in the positions they will occupy for the manual assisting of the motor in applying the brakes;

Figure 4 is a view similar to Figure 1, showing a modified form of the invention;

Figure 5 is a fragmentary elevation, parts being broken away, showing the valve operating means and associated elements of the modified form of the invention.

Figure 1:
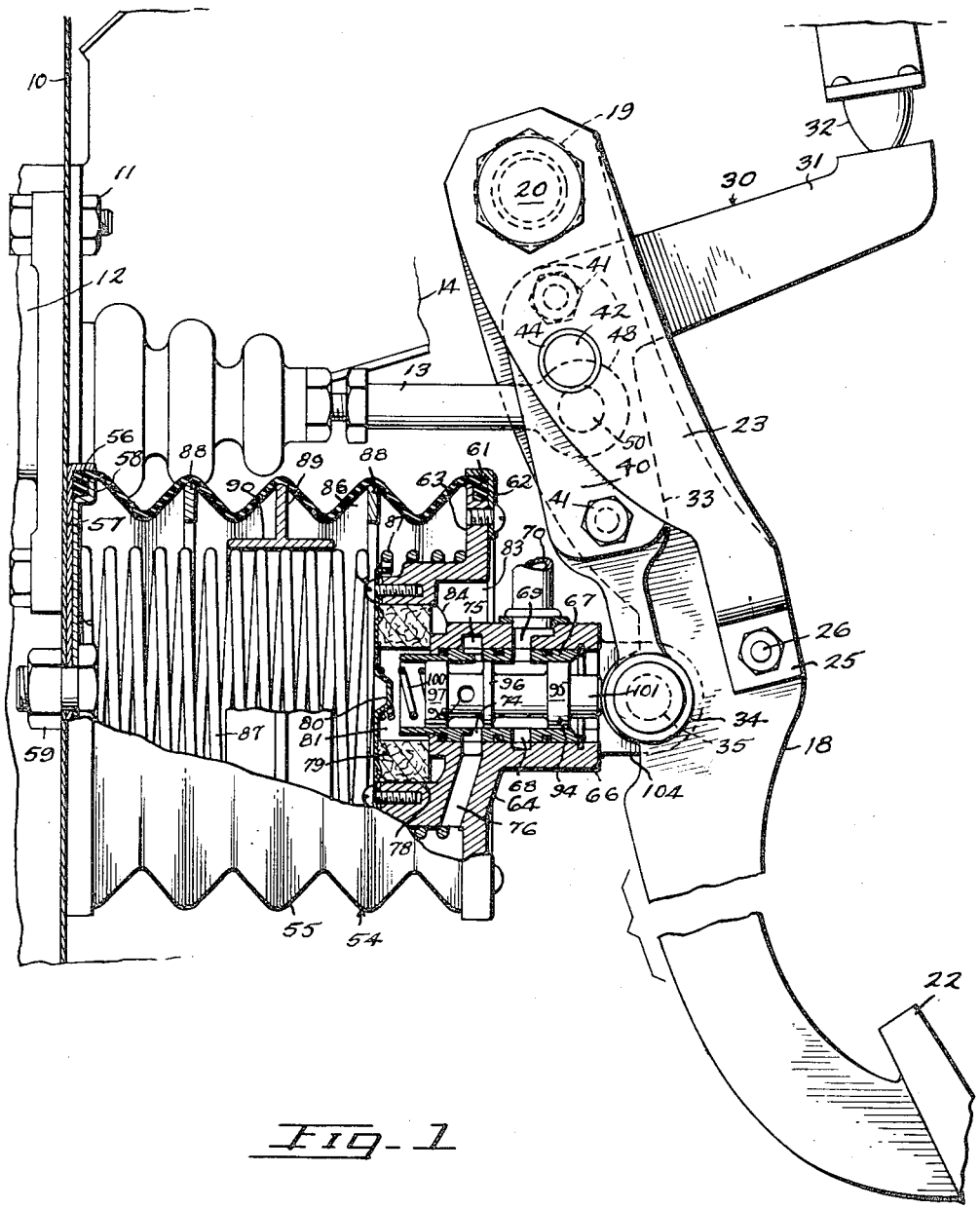
Figure 1 is a side elevation of the mechanism with the parts in off position, parts being broken away and the vehicle fire wall and portions of the motor being shown in section.

Referring to Figures 1 and 3, the numeral 10 designates the fire wall of a motor vehicle to which is bolted, as at 11, a master cylinder 12 in which is mounted the usual piston (not shown) operable by a rod 13 to displace fluid from the master cylinder in the usual manner. The master cylinder and its mounting are now conventional and need not be shown in detail.

Master cylinders of the type referred to are operable by means of depending levers pivotally supported with respect to a rearwardly extending, substantially U-shaped conventional bracket 14 having opposite spaced side walls. For the conventional pedal lever of such type, there is substituted in the present case a lever 18 carried at its upper end by a sleeve 19 rotatable on a shaft 20 extending through the opposite side walls of the bracket 14. The pedal lever 18 at its lower end carries a conventional pedal pad 22 (Figure 1). A bracing lever arm 23 also is carried at its upper end by the sleeve 19 and is offset inwardly adjacent its lower end as at 24 and then turned downwardly, as at 25, to lie against the adjacent portion of the lever 18 to which it is bolted, as at 26.

The body portions of the lever 18 and arm 23 are arranged in spaced parallel relation. In the space between these members is arranged a bell crank lever 30 having a rearwardly extending arm 31 engageable with a bumper 32 to limit swinging movement of the bell crank lever to the position shown in Figure 1 when the parts are in the off position. The other arm 33 of the bell crank lever carries at its lower end a bearing 34 in which is arranged a pin 35 movable in a slot 36 (Figure 3) formed in the lever 18. The pin 35 and its operation will be further described below.

The bell crank lever arm 33 is provided with a cap member 40 fixed thereto as at 41. This cap and the bell crank lever arm 33 are provided respectively with alined trunnions 42 mounted to rock in bearings 44 carried respectively by the members 23 and 18.

The operating rod 13 for the master cylinder is provided with a head 48 projecting into a pocket within the bell crank lever arm 33 and cap 40. The head 48 carries trunnions 50 rotatably supported by the lever arm 33 and cap 40. It will be apparent that bodily movement of the head 48 toward the master cylinder will operate the piston thereof to displace fluid into the brake lines.

At a point spaced below the axis of the master cylinder is arranged a differential fluid pressure operated motor indicated as a whole by the numeral 54 and forming the subject matter of the present application. This motor comprises a bellows 55 formed of rubber or any other suitable material and provided at one end with a bead 56 clamped between plates 57 and 58, as shown in Figure 1, and these plates are bolted as at 59 to the fire wall 10. The other end of the bellows 55 is provided with a bead 61 clamped between an annular cap member 62 and a flange 63 formed integral with a movable head 64. The head 64, as an integral part thereof, is provided with a cylindrical portion 66 in which is arranged a valve sleeve 67 having ports 68 communicating between the interior of the sleeve and a vacuum port 69 formed in the cylinder 66 and connected to one end of a vacuum line 70. This line leads to the intake manifold of the vehicle engine or any other suitable source of vacuum. The valve sleeve 67 is further provided with ports 74 communicating outwardly thereof with an annular passage 75, and the valve body is provided with a duct 76 communicating between the passage 75 and the interior of the motor 54.

The head 64 is provided within the motor with an annular recess 78 in which is arranged an annular air cleaner 79 maintained in position by a solid cap 80. The space 81 within the air cleaner forms an air chamber, as further described below.

The head 64 is provided in the outer face thereof with recesses 83 (Figures 1 and 2) open at their outer ends to the atmosphere and communicating at their inner ends with a bowed portion 84 of the recess 78, the recesses 83 accordingly providing openings for the admission of air to the air cleaner 79.

The head 64, as will become apparent, has its outer face subject to atmospheric pressure while its inner face is subject to pressures within the motor chamber 86, which pressures are controlled by a valve described below. Within the chamber 86 is arranged a return spring 87 engaging the head 64 at one end and having its opposite end engaging the plate 58. The bellows 55 is provided with a pair of spaced subtending rings 88, and between these is preferably arranged an additional subtending ring 89 having a radially inner cylindrical flange 90 in which the spring 87 is arranged to assist in positioning the bellows and spring relative to each other.

A valve indicated as a whole by the numeral 94 is slidable in the sleeve 67. This valve is provided with a pair of spaced heads 95 and 96, and the head 96 is spaced from a third head 97. The shank of the valve, which carries the heads referred to, is provided between the heads 96 and 97 with radial ports 98 communicating with an axial recess 99 in the valve 94, which recess communicates with the chamber 81. A small biasing spring 100 is interposed between the valve 94 and cap 80 to urge the valve to its off position shown in Figure 1.

The valve 94 projects to the right of the head 95 as viewed in Figures 1 and 2 to form an operating stem 101. The adjacent edge of the lever 18 is arcuately curved as at 102 to form a contact surface engageable with the end of the stem 101 to move the valve 94 to the left upon operation of the pedal lever 18. The slot 36 is formed in the pedal lever adjacent the arcuately formed operating edge 102 as clearly shown in Figures 3 and 4. The head 64 is provided with spaced integral ears 104 (Figures 1, 2 and 3) and the pin 35 passes through these ears and accordingly is movable with the head 64.

In Figures 4 and 5, we have shown a modified type of apparatus in which the operational characteristics are substantially identical with the form described. Referring to Figure 4, the numeral 110 designates a master cylinder having the usual piston (not shown) therein operable by a rod 111. In the modified form of the invention, the conventional bracket arm 14, described above, carries a pivot pin 112 (Figure 4) surrounded by a sleeve 113 mounted to rock thereon and welded or otherwise connected to the upper end of a pedal lever 114. Such lever, as before, is provided with a conventional pedal pad 115 and the pedal is of the depending type.

Below the pin 112, the pedal lever carries a sleeve 118 preferably welded thereto, and this sleeve rotatably supports a pin or rock shaft 119 to the remote end of which as viewed in Figure 4 is connected a depending lever 120 which functions in the same manner as the arm 33 of the bell crank lever 30 previously described. At its other end, the rock shaft 119 is provided with a preferably integral eccentric collar 121 carrying a pivot pin 122 to which is connected a head 123 carried by the operating rod 111.

At its lower end, the lever or arm 120 carries a pin 127. The pin 127 projects through an enlarged opening 129 in the pedal lever 114, and within such opening the pin 127 is preferably surrounded by a rubber or similar silencing sleeve 130. The opening 129 may be circular, as shown in Figure 6, and serves the same purpose as the slot 36 previously described, as will become apparent.

Referring to Figure 4, the numeral 135 designates a fluid motor having a stationary head or wall 136 carried by a bracket 137 suitably secured to the fire wall 10 of the motor vehicle. The motor further comprises a movable head or wall 140, and secured at its opposite ends to the two motor heads is a bellows 141 provided therewithin with subtending rings 142 between which is arranged a subtending ring 143. The ring 143 is provided with a cylindrical portion 144 surrounding a compression return spring 145 engaging at its ends against the heads 136 and 140.

The head 140 carries a preferably integral valve housing 146 in which is arranged a sleeve 147 ported as at 148 and 149 for communication respectively with chambers 150 and 151 formed in the valve housing. The chamber 150 communicates with one end of a hose 153, the other end of which is connected to the intake manifold or other suitable source of vacuum. The chamber 151 communicates through a passage 154 with the motor chamber 155 formed by the motor heads 136 and 140 and the bellows 141.

A valve 156 is slidable in the sleeve 147 and is provided with heads similar to the valve previously described to form annular grooves 157 and 158 normally communicating respectively with the ports 148 and 149. The valve 156 is provided with an axial recess 160 communicating through ports 161 with the groove 158.

A cap 163 is arranged over the inner face of the head 140 and houses therein an air cleaner 164 to which air is fed through one or more openings 165 leading through the head 140 to the atmosphere. A chamber 166 radially inwardly of the air cleaner communicates with the axial valve passage 160. A spring 167 is interposed between the cap 163 and valve 156 to urge the latter to the off position shown in Figure 4.

A rod 170 is welded at one end to the cap 163 and is slidable through a flexible seal 171 carried by the head 136, the rod inwardly of such seal being pressure sealed as at 172. Forwardly of the seal 171, the rod 170 carries a silencing cushion 173 engageable with the flexible seal 171 and the surrounding portion of the head 136. The member 173 is held in position by a nut 174 threaded on the rod 170.

Within the valve housing is arranged a seal 176 engageable with the rear end of the valve 156, and the latter is provided with a port 177 communicating through the rear end wall of the valve 156 to subject the inner face of the seal 176 to atmospheric pressure at all times.

At its rear end, the valve 156 is provided with a stem 180 engaged by a curved lateral extension 181 (Figure 5) carried by a washer 182 preferably welded to the adjacent face of the pedal lever 114. It will be apparent, therefore, that upon movement of the pedal lever 114 from the normal off position shown in Figure 4, the member 181 will engage the valve stem 180 and move the valve to the left of its normal off position shown in Figure 4.

The valve body 146 is provided with a rearwardly extending ear 186. The pin 127 is fixed to the ear 186.

Operation

The operation of the form of the invention shown in Figures 1, 2 and 3, is as follows. The biasing spring 87 moves the head 64, forming the pressure head of the motor, to the position shown in Figure 1, and the spring 100 biases the valve 94 to the off position. Under such conditions, the stem 101 engaging the operating edge 102 of the pedal lever holds this lever in its off position. The rod 13 is biased to its limit of movement toward the right in Figure 1 by the springs 87 and 100, the bell crank lever effecting such movement and turning about the axis of the trunnions 42 to maintain the lever arm 31 against the bumper 32.

When the brakes are to be operated, the pedal pad 22 will be pushed downwardly and forwardly, and due to the slot 36 (Figure 2) the pedal lever 18 is free to move independently of the bell crank lever 30 during motor energizing movement. In the off positions of the parts, the ports 74 communicate with ports 98 and thus with the air chamber 81, and atmospheric pressure will be present in the motor chamber 86. Promptly upon depression of the pedal pad 22, however, the valve 94 will be moved to the left of the position shown in Figure 1. This operation moves the head 96 across the ports 74 to close communication between the motor duct 76 and the atmosphere and to open communication from such duct through ports 74 to the space between the heads 95 and 96 and thus to the vacuum port 69.

Air will now be exhausted from the motor chamber 86, and atmospheric pressure acting against the head 64 will move such member toward the left. This movement will continue so long as pedal pressure is applied to maintain the valve 94 in a motor energizing position relative to the valve sleeve 67.

As soon as the motor is energized in the manner stated, the ears 104 will impart movement to the pin 35 to move the lower bell crank lever arm 33 toward the left. This operation takes place with the lever 18 swinging in a clockwise direction about its supporting shaft 20, and accordingly the trunnions 42 will be moved to the left as the lower end 33 of the bell crank lever partakes of the same movement, but at a slower rate, due to the lever lengths involved, as will be apparent.

Brake applying force will be applied to the rod 13 through the trunnions 50, and this force will be applied partly through the trunnions 42, movable with the pedal lever, and partly by the pin 35, movable by the motor.

The operation of the apparatus so far as brake application is concerned is fully described in the co-pending application referred to.

The operation involved in the returning of the parts to normal off positions will be apparent. Promptly upon the releasing of the pedal lever 18, the spring 100 will move the valve 94 to its normal off position, the lever 18 swinging counterclockwise relative to its supporting shaft 20 until the pin 35 is arranged in the left-hand end of the slot 36. The motor chamber 86 will now be connected to the atmosphere through ports 74 and 98 and through the air chamber 81, and the biasing spring 87 will move the motor head 64 back to its normal position shown in Figure 1.

It will be noted that all of the control mechanism for the motor is carried by the head 64. In other words, this head carries therewithin the sleeve 67 in which the valve 94 is operable and the head also carries therein the air cleaner 79 through which air must pass before reaching the motor chamber 86. The head 64 also contains therein the vacuum chamber 69 adapted for connection with a source of vacuum. The head 64, therefore, while quite compact, carries the entire control mechanism for the motor.

The bellows 55 of course is highly flexible and when vacuum is present in chamber 86 the atmospheric pressure externally of the bellows would tend to collapse it. This radial collapse is prevented by the separate subtending rings 88 and 89, these rings however having no effect on the endwise collapsing of the bellows when the motor is energized. It also will be noted that because of its flexibility, the bellows 55 will tend to sag intermediate its length. This sagging tendency is minimized by utilizing the return spring 87 as a support for the cylindrical flange 90.

In the form of the invention shown in Figures 4 and 5, the parts normally occupy the positions shown in Figure 4. When the brake is to be operated, the pedal pad 115 is depressed to swing the pedal lever 114 in a clockwise direction about the axis of the pin 112. The lateral extension 181, movable with the pedal lever, engages the valve stem 180 and moves the valve 156 to the left, disconnecting the ports 161 from the ports 149. Previously, the motor chamber 155 will have been in communication through these ports with the air chamber 166, but movement of the valve referred to now disconnects the motor chamber 155 from the atmosphere. The valve groove 157 is now moved into communication with the ports 149, thus connecting the source of vacuum to the interior of the motor by means of the pipe connection 153, chamber 150, etc. The movable wall 140 now starts to move to the left carrying with it, through ear 186, the pin 127 which is carried by the lower end of the lever arm 120. Thus a force is imparted to the shaft 119 tending to rock it and move the operating rod 111 (Figure 4) to the left. Since movement will be imparted to the shaft 119 to move the latter bodily to the left upon operation of the pedal lever 114, the pedal lever cooperates with the motor in applying force to the rod 111 to move it to the left and displace fluid from the master cylinder into the brake lines.

When the motor is energized, the wall 140 moves toward the left carrying with it the rod 170 which slides in the bearing 171. The rod 170 limits movement of the movable head 140 to off position and also assists in supporting the weight of the valve housing 146, practically all of the weight of this unit being arranged to the left of the pin 127.

The movement of the parts to off position will be apparent from the foregoing. When pressure on the pedal pad 115 is released, the spring 167 will return the valve 156 to its normal off position connecting the motor chamber 155 to the atmosphere. The return spring 145 will now return the movable motor wall 140 to the normal position shown in Figure 6, and such movement is limited by engagement of the cushion member 173 with the bearing 171.

Whereas movement of the movable motor wall of the form of the invention previously described is limited by engagement of the bell crank lever arm 31 with the bumper 32, the use of a bell crank lever is unnecessary in the modified form of the invention since movement of the lever arm 120 is limited by the means carried by the rod 170, just described.

In connection with the modified form of the invention shown in Figure 4, particular attention is invited to the fact that the rod 170, being fixed with respect to the movable head 140, is always in alinement with the axis of such head. Therefore, any tendency for the head 140 to swing is effectively prevented by the rod 170. This rod accordingly acts substantially to fix the movable head 140 in coaxial relationship with the stationary head 136. Moreover, when the brake pedal is suddenly fully released for rapid deenergization of the motor, the cushion 173, carried by the rod 170, silences the stopping of the movable head 140 in its normal off position.

It is to be understood that the forms of the invention shown and described are to be taken as preferred examples of the same and that the invention is defined in the appended claims.

We claim:

1. A fluid pressure operated motor comprising a stationary head, a movable head spaced therefrom, and a bellows connecting said heads and forming therewith an internal variable pressure chamber, a valve mechanism carried by said movable head and comprising a pair of valve elements one of which is fixed to said movable head and the other of which is movable independently of said movable head, an air cleaner carried by said movable head, said valve elements being constructed to establish communication between said variable pressure chamber and the atmosphere through said air cleaner when said movable valve element is in a normal position, a vacuum chamber in said movable head, said movable valve element being movable from its normal position to disconnect said variable pressure chamber from the atmosphere and connect it to said vacuum chamber whereby said movable head is moved by atmospheric pressure toward said stationary head, a lever supported for turning movement on an axis spaced from the motor, said lever being pivotally connected to and supporting said movable head for movement toward and away from said stationary head, and means independent of said lever for moving said movable valve from its normal off position.

2. A fluid pressure operated motor comprising a stationary head, a movable head spaced therefrom and a deformable bellows connected between said heads and forming therewith a variable pressure chamber, rigid means within said chamber engaging and supporting said bellows to fix the latter against inward collapsing when vacuum is present in said variable pressure chamber, a valve mechanism carried by said movable head and comprising a valve element having a normal position connecting said variable pressure chamber to the atmosphere and movable from such position to connect said chamber to a source of vacuum whereby said movable head is moved by atmospheric pressure toward said stationary head, and a return spring engaging at opposite ends against said heads and biasing said movable head to a normal position, said rigid means comprising a member encircling and engaging said spring to be supported thereby to prevent sagging of said bellows intermediate its ends.

3. A fluid pressure operated motor comprising a stationary head, a movable head spaced therefrom and a deformable bellows connected between said heads and defining therewith a variable pressure chamber, said bellows being of circular cross section and being provided at spaced points therealong with independent subtending rings within said chamber engaging said bellows throughout its circumference to prevent radial collapsing thereof when vacuum is present in said variable pressure chamber, a coiled compression spring in said variable pressure chamber engaging at opposite ends against said heads to bias said movable head to a normal position, one of said subtending rings having a cylindrical radially inner portion surrounding and engaging said spring to be supported thereby to prevent sagging of said bellows intermediate its ends, and a valve mechanism normally connecting said variable pressure chamber to the atmosphere and operable for connecting such chamber to a source of vacuum whereby said movable head is moved by atmospheric pressure toward said stationary head.

4. Apparatus according to claim 3 wherein said valve mechanism comprises a pair of valve elements one of which is carried by and fixed with respect to said movable head and the other of which is slidable in said one valve element, said slidable valve element normally occupying a position connecting said variable pressure chamber to the atmosphere and movable to connect such chamber to a source of vacuum.

5. Apparatus according to claim 3 wherein said valve mechanism comprises a pair of valve elements one of which is carried by and fixed with respect to said movable head and the other of which is slidable in said one valve element, said slidable valve element normally occupying a position connecting said variable pressure chamber to the atmosphere and movable to connect such chamber to a source of vacuum, and an air cleaner carried by said movable head and interposed between said valve mechanism and the atmosphere.

6. A fluid pressure operated motor comprising a stationary head, a movable head spaced therefrom and a deformable bellows connected between said heads and defining therewith a variable pressure chamber, said bellows being of circular cross section and being provided at spaced points therealong with independent subtending rings within said chamber engaging said bellows throughout its circumference to prevent radial collapsing thereof when vacuum is present in said variable pressure chamber, a coiled compression spring in said variable pressure chamber engaging at opposite ends against said heads to bias said movable head to a normal position, one of said subtending rings having a cylindrical radially inner portion surrounding and engaging said spring to be supported thereby to prevent sagging of said bellows intermediate its ends, and a valve mechanism comprising a valve sleeve carried by said movable head coaxial therewith and a movable valve slidable in said sleeve, said head being provided with an annular recess concentric with said sleeve, and an annular air cleaner mounted in said recess, said air cleaner having one side exposed to atmosphere and provided therewithin with an air space, said movable valve normally occupying a position connecting said air space to said variable pressure chamber and being movable to disconnect said air space from said variable pressure chamber and connect the latter to a source of vacuum whereby said movable head is moved by atmospheric pressure toward said stationary head.

7. A fluid pressure operated motor comprising a stationary head, a movable head, and a deformable bellows connected between said heads and defining therewith an internal variable pressure chamber, said stationary head having an opening therethrough, a deformable packing seal mounted in said opening, and an axially elongated rigid member fixed at one end to said movable head and having its opposite end slidably projecting through said seal, a lever pivotally supported at a point transversely remote from the axis of said movable head, a pivot pin connecting said lever to said movable head adjacent the axis thereof, and a valve mechanism carried by said movable head and having a movable valve element occupying a normal position connecting said variable pressure chamber to the atmosphere and movable to connect said variable pressure chamber to a source of vacuum whereby said movable head is moved by atmospheric pressure toward said stationary head, said valve having an element engageable for operating it located adjacent said pivot pin.

8. A fluid pressure operated motor comprising a stationary head, a movable head, and a deformable bellows connected between said heads, said bellows being of circular cross section from end to end and being normally approximately coaxial with said heads, the space within said bellows defining a variable pressure chamber, an axially elongated rigid member fixed at one end to said movable head and having its opposite end slidably projecting through said stationary head in sealed relation therewith to tend to maintain said movable head coaxial with said stationary head, a plurality of spaced rigid subtending rings in said variable pressure chamber corresponding in shape to and engaging throughout their peripheries with said bellows to prevent radial collapsing thereof when vacuum is present in said variable pressure chamber, a coiled return spring in said variable pressure chamber engaging at opposite ends against said heads, and means carried by one of said subtending rings and engaging said spring to tend to support said bellows against sagging intermediate its ends, and a valve mechanism having a movable valve element occupying a normal position connecting said variable pressure chamber to the atmosphere and movable to connect said variable pressure chamber to a source of vacuum whereby said movable head is moved by atmospheric pressure toward said stationary head.

9. A fluid pressure operated motor comprising a stationary head, a movable head, and a deformable bellows connected between said heads, the space within said bellows defining a variable pressure chamber, an axially elongated rigid member fixed at one end to said movable head and having its opposite end slidably projecting through said stationary head in sealed relation therewith to tend to maintain said movable head coaxial with said stationary head, and a valve mechanism for controlling said motor comprising a sleeve mounted in said movable head in fixed relation thereto and a spool valve slidable in said sleeve, said spool valve having a normal position relative to said sleeve connecting said variable pressure chamber to the atmosphere and movable to disconnect said variable pressure chamber from the atmosphere and connect it to a source of vacuum whereby said movable head is moved by atmospheric pressure toward said stationary head, said movable head at the outer end thereof having an opening, an operating member carried by said spool valve and projecting through such opening, and a circular sealing diaphragm connected in sealed relationship at its radially inner and outer edges to said movable head and to said spool valve adjacent one end thereof to seal said valve and said sleeve to the atmosphere, said end of said valve, in the normal position of said valve, seating against said diaphragm and having an atmospheric port therethrough.

10. A differential fluid pressure motor comprising a fixed head, a movable head spaced therefrom and a deformable bellows connected between said heads and forming therewith a variable pressure motor chamber, said heads being normally approximately coaxial, an elongated rigid member fixed at one end to said movable head and slidably projecting through said stationary head in sealed relation thereto, means biasing said movable head away from said stationary head to a normal motor-de-energized position, a stop member carried by said rigid member and engageable with said stationary head when said movable head is in normal position to limit movement of such head, and a valve mechanism comprising a valve element having a normal position connecting said variable pressure chamber to the atmosphere and movable from such position to connect said variable pressure chamber to a source of vacuum whereby said movable head is moved by atmospheric pressure toward said stationary head.

11. A fluid pressure motor according to claim 10 wherein said bellows is of circular cross section from end to end, and a plurality of spaced subtending rings in said variable pressure chamber corresponding in shape to and engaging throughout their peripheries with said bellows to support the latter against radial collapsing when vacuum is present in said variable pressure chamber.

12. A fluid pressure motor according to claim 10 wherein said bellows is of circular cross section from end to end, and a plurality of spaced subtending rings in said variable pressure chamber corresponding in shape to and engaging throughout their peripheries with said bellows to support the latter against radial collapsing when vacuum is present in said variable pressure chamber, said means for biasing said movable head to its normal position comprising a coiled compression spring engaging at opposite ends against said heads, one of said subtending rings having a cylindrical portion surrounding and engaging said spring to support said bellows against sagging intermediate its ends.

13. A fluid pressure operated motor comprising a stationary head, a movable head, and a deformable bellows connected between said heads and defining therewith an internal variable pressure chamber, said stationary head having an opening therethrough, a deformable packing seal mounted in said opening, and an axially elongated rigid member fixed at one end to said movable head and having its opposite end slidably projecting through said seal, a lever pivotally supported at a point transversely remote from the axis of said movable head, a pivot pin connecting said lever to said movable head adjacent the axis thereof, means biasing said movable head away from said stationary head to a normal motor de-energized position, means carried by said rigid member for limiting movement of said movable head to said normal position, and a valve mechanism carried by said movable head and having a movable valve element occupying a normal position connecting said variable pressure chamber to the atmosphere and movable to connect said variable pressure chamber to a source of vacuum whereby said movable head is moved by atmospheric pressure toward said stationary head, said valve having an element engageable for operating it located adjacent said pivot pin.

References Cited in the file of this patent

UNITED STATES PATENTS

| | | |
|---|---|---|
| 368,089 | Hinds | Aug. 9, 1887 |
| 1,015,962 | Kenner | Jan. 30, 1912 |
| 1,900,165 | Monge | Mar. 7, 1933 |
| 1,908,471 | Brewer | May 9, 1933 |
| 2,207,700 | Porter | July 16, 1940 |
| 2,208,282 | Shelor | July 16, 1940 |
| 2,302,435 | Farmer | Nov. 17, 1942 |
| 2,536,461 | Price | Jan. 2, 1951 |

FOREIGN PATENTS

| | | |
|---|---|---|
| 385,410 | Great Britain | Dec. 12, 1932 |
| 758,217 | France | Oct. 23, 1933 |